US007160066B2

(12) United States Patent
Baker

(10) Patent No.: US 7,160,066 B2
(45) Date of Patent: Jan. 9, 2007

(54) MOUNTING ARRANGEMENT AND METHOD

(75) Inventor: Ian J Baker, Burton on Trent (GB)

(73) Assignee: Rolls-Royce plc, London (GB)

( * ) Notice: Subject to any disclaimer, the term of this patent is extended or adjusted under 35 U.S.C. 154(b) by 75 days.

(21) Appl. No.: 10/809,527

(22) Filed: Mar. 26, 2004

(65) Prior Publication Data

US 2004/0200327 A1 Oct. 14, 2004

(30) Foreign Application Priority Data

Apr. 9, 2003 (GB) ................................ 0308170.0

(51) Int. Cl.
*B23Q 3/00* (2006.01)

(52) U.S. Cl. ...................... 409/141; 409/225; 409/132; 72/457; 269/27; 269/47; 269/142; 269/254 R

(58) Field of Classification Search ................ 409/141, 409/225, 132, 219, 131; 72/457, 458, 459, 72/460, 461; 269/24, 25, 27, 32, 47, 140, 269/142, 254 R, 268, 289 R, 296, 297, 303, 269/305, 315, 900; 29/560.1; 199/50; 76/79.5, 76/78.1, 79

See application file for complete search history.

(56) References Cited

U.S. PATENT DOCUMENTS

| | | | | |
|---|---|---|---|---|
| 3,975,030 | A * | 8/1976 | Akeel et al. | 279/4.12 |
| 4,344,609 | A | 8/1982 | Bond | |
| 4,669,227 | A * | 6/1987 | Treppner | 269/900 |
| 4,794,687 | A * | 1/1989 | Peters et al. | 29/559 |
| 4,964,766 | A | 10/1990 | Turchan | |
| 5,081,765 | A * | 1/1992 | Fraser et al. | 409/132 |
| 5,448,819 | A * | 9/1995 | Grassi | 29/558 |
| 5,680,801 | A * | 10/1997 | Keller | 82/1.11 |
| 5,695,177 | A * | 12/1997 | Mascola | 269/24 |
| 5,984,291 | A * | 11/1999 | Iwata et al. | 269/71 |
| 6,231,280 | B1 * | 5/2001 | Bullen | 409/141 |
| 6,241,435 | B1 * | 6/2001 | Huang et al. | 409/141 |
| 6,435,494 | B1 * | 8/2002 | Takahashi et al. | 269/32 |
| 6,631,556 | B1 * | 10/2003 | Lee | 29/832 |
| 6,719,503 | B1 * | 4/2004 | McCalmont et al. | 409/141 |
| 6,938,454 | B1 * | 9/2005 | Strasser et al. | 72/420 |

FOREIGN PATENT DOCUMENTS

| | | | |
|---|---|---|---|
| DE | 4206605 | A | 9/1993 |
| EP | 0093042 | A | 11/1983 |
| FR | 2661631 | A | 11/1991 |
| WO | WO 99/21684 | A | 5/1999 |

* cited by examiner

*Primary Examiner*—Dana Ross
(74) *Attorney, Agent, or Firm*—W. Warren Taltavull; Manelli Denison & Selter PLLC

(57) ABSTRACT

A mounting arrangement 1 is provided in which clamping pairs comprising a clamping pad 2 and seating pads 3 are arranged about a mounting end of a component 4. Thus, the component 4 is appropriately presented to a machining device but the component 4 can slip relative to the pads 2, 3 in order to relieve residual stresses in the component due to initial forging processes. A damper 8 is provided in order to augment vibration control in association with the contact abutments between the pads 2, 3. In such circumstances accurate machining of a component 4 to a final profile 6 from an initial rough profile 5 can be achieved more efficiently without periodic release of the component 4 so that distortions are avoided in the final component as a result of retained residual stresses by previous clamping.

12 Claims, 2 Drawing Sheets

MOUNTING ARRANGEMENT AND METHOD

FIELD OF THE INVENTION

The present invention relates to mounting arrangements for and methods of machining components such as turbine discs and compressor discs which may retain residual stresses after initial forging.

BACKGROUND OF THE INVENTION

A number of components are initially cast or forged into an approximate shape for the final finished component. Such an approach allows ease of manufacture as well as potential crystallography and material treatment to be achieved conveniently. The forged component such as a turbine disc is then machined appropriately in order to achieve the final component shape and surface finish. Generally the original forged component only provides a rough approximation to the final finished shape and so a significant proportion of the forged material must be removed in order to achieve the desired finished shape.

Machining of the forged component is typically through milling, turning or broaching whereby material is removed from the rough forged component until the desired finished shape is achieved. For example, Heyligenstaedt four-axis turning machines are known for providing the final machining of rough forged components into desired compressor discs. Unfortunately, these machines are designed for high accuracy operation such that multiple abutment clamping of the component is necessary and normally a datum such as a flat surface is initially provided to the component to ensure surety of position and therefore machined accuracy in the final product. Such robust and accurate assembly as indicated is highly beneficial with regard to high accuracy machining processes but with regard to machining initially rough forged components may be detrimental.

It will be understood that forged components generally retain residual stresses arising from the forging or casting process. These residual stresses cannot be relieved in the above forged component due to the high strength clamping inherent in machines such as Heyligenstaedt four-axis turning machines for accurate forming. In such circumstances, when the multi abutment clamping is released the final machine component may become distorted as these residual stresses are then relieved. Such distortion clearly detracts from the desired shape profile for the component in its finished state.

SUMMARY OF THE INVENTION

According to one aspect of the present invention, a mounting arrangement for simultaneous machining of opposite faces of a component which may retain residual stresses comprises multiple point contact abutment clamping in use of a component, the arrangement characterised in that only three clamp pairs are provided to enable residual stress relief in use as the component is machined and incorporating a damper to augment vibration control otherwise diminished by the reduced contact clamping provided by only minimal contact abutments.

Each clamp pair is preferably provided by opposed pairs of a clamping pad and seating pad either side of the component. The clamping pad and the seating pad may be configured for consistency with the presented component profile. Such consistency may ensure appropriate approximate configuration of the component within the mounting arrangement.

Each contact abutment may be adjustable in terms of presentation relative to the component. The damper may be perpendicular to the axial direction of contact abutment.

The damper may comprise a hydraulic ram and a damper member, the damper member being held in contact with the component by a force. The force may be variable. The force applied by the damper may be controlled dependent on sensed vibration or machining process step/regime or current process step, or to facilitate an anti-phase cancellation oscillation within the component to harmonic vibration beats.

The damper may comprise a contact finger of elastomeric material.

According to a second aspect of the invention, a method of simultaneously machining opposite faces of a component which may retain residual stresses comprises clamping the component with multiple point abutment contacts and thereafter machining the component, the component being clamped by only three clamp pairs and a vibration damper being applied to the component in order to augment vibration control otherwise diminished by reduced contact abutments.

The method may comprise an initial machining process for removal of bulk material from a rough initial component and a final machining process with more resilient clamping of the component for more accurate machining of that component.

BRIEF DESCRIPTION OF THE DRAWINGS

An embodiment of the present invention will now be described by way of example with reference to the accompanying drawings in which.

DETAILED DESCRIPTION OF THE INVENTION

Figure 1:
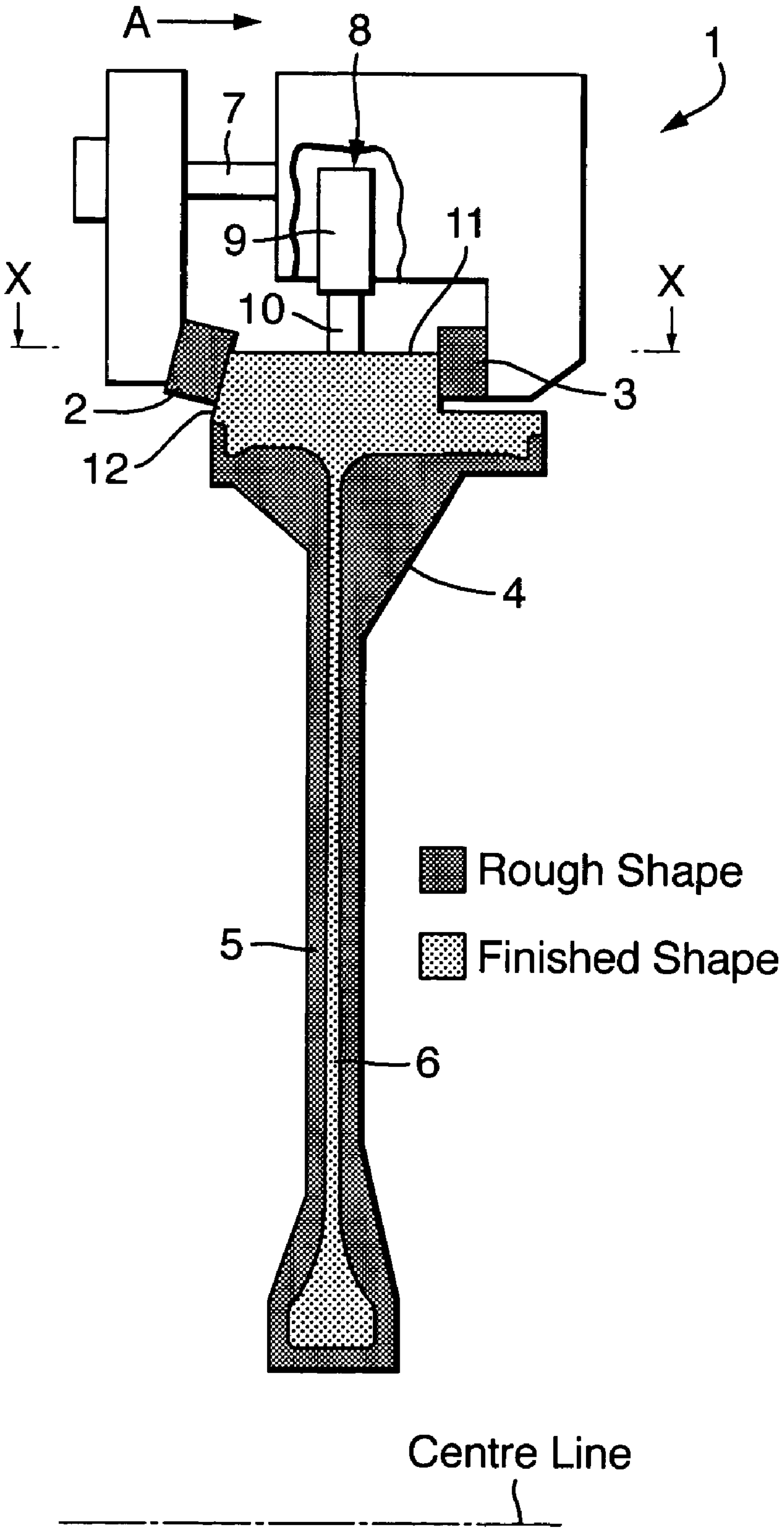
FIG. 1 is a schematic half cross-section of a mounting arrangement about a centre line X—X.

Referring to FIG. 1 which is a schematic cross-section of a mounting arrangement 1 in accordance with the present invention. Thus, the arrangement 1 comprises a clamp pair formed by abutment contact between a clamping pad 2 and a seat pad 3. The clamp pair creates a contact abutment in order to clamp a component 4. This component 4 as illustrated in FIG. 1 is initially a rough forged component with an outline profile 5 but upon machining by means not depicted is rendered with a finished profile 6. Such machining can be by turning or other technique as required. The component will be turned relative to a tool.

In order to provide clamping force an axial movement in the direction of arrowhead A is provided such that contact abutment is achieved between the clamping pad 2 and seating pad 3. Generally, this axial movement in the direction of arrowhead A will be through a screw thread 7 driven by a worm gear or otherwise in order to create the necessary clamping force across the pair of clamping pad 2 and seating pad 3.

In accordance with the present invention a damper 8 is provided which engages the component 4 in order to achieve vibration control. The damper 8 comprises a hydraulic ram 9 with a damper member 10 extending downwards into contact with a surface 11 of the component 4. Thus the damper 8 will damp vibrations created within the component 4 as it is machined from the initial rough forged profile 5 to the finished profile 6.

In accordance with the present invention a minimum number of clamp pairs are provided in order to allow relief of residual stresses created within the component 4 as a result of the forging or casting process. The minimum number of clamp pairs is three. Contact abutments created across opposed clamp pairs will normally be arranged with a 120° angle between clamp pairs, as the component 4 is round. The number of clamping pairs provided will be three to present the component 4 to the appropriate turning device rather than resiliently secure consistent presentation of that component 4 throughout machining for accurate determination of the final profile 6. In such circumstances residual stresses within the component 4 can be relieved by slip movement or other relief about the pads 2, 3 and between the clamping pairs created between the clamping pads 2 and seating pad 3. Residual stresses can be relieved during machining and upon release of the finished or part finished component from the present clamping pairs there is less distortion of that component from the final machined shape 6.

In previous systems eight or more clamping pairs have been provided in order to mount the component with sufficient resilient strength for consistent presentation but such resilient securing of the component 4 prevents relief of residual stresses in the component 4 during machining processes.

By provision of the minimum number of clamping pairs to present the component to the machining device it will be understood that the component is thereby able to adjust in order to release the residual stresses caused by the forging process but also unfortunately will tend to vibrate to a far greater extent. Thus, the damper 8 augments vibration control previously achieved through multipoint contact abutments with generally in excess of eight clamping pairs. In such circumstances the detrimental affects of vibration within the component 4 as it is machined from the initial rough profile 5 to the finished profile 6 are inhibited. Vibration itself may cause erroneous machining of the component 4 so that such vibration control is necessary.

The present invention provides a "looser" presentation of the component 4 to the machining device to allow relief of residual stresses but incorporates provision of a damper 8 in order to control vibration in association with the remaining clamping abutment contacts across a mounting end of the component 4.

Figure 2:
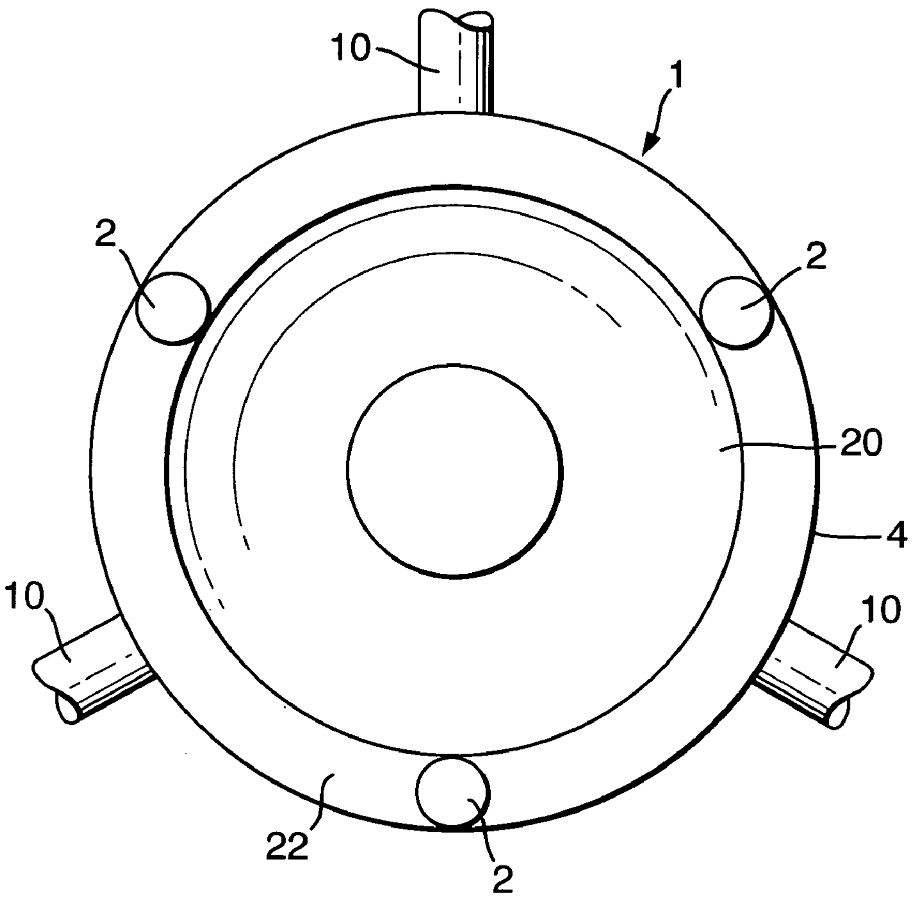
FIG. 2 is a schematic plan view of a whole mounting arrangement in the direction X—X depicted in FIG. 1; and, FIG. 3 is a side view of the arrangement depicted in FIG. 2.
Figure 3:
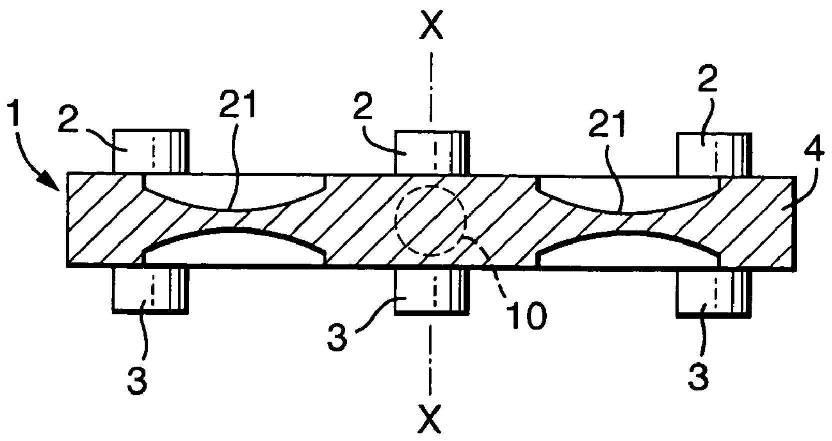

Referring to FIGS. 2 and 3 which schematically illustrate the mounting arrangement 1 in accordance with the present invention. Thus, three clamping pairs constituted by pads 2, 3 are provided to support the component 4 in an appropriate orientation so that the component 4 may be turned in order to machine an area 20 to an appropriate profile. As indicated previously, the component 4 is generally rotated about an axis X—X. By providing three clamping pairs at equal spacing around the component 4 it will be understood that the component is thereby reliably mounted but with an ability to adjust for stress relief. Typically, the component 4 will be a disc secured within a substantially vertical orientation with turning tools extending inwardly to machine the area 20. These tools would be presented in an opposed orientation either side of the component 4 for balance. Generally, the clamping pairs will be adjusted to ensure appropriate vertical presentation of the component 4 for turning and machining purposes. As indicated in FIG. 3, generally the turning process will remove material from areas 21 in order to shape the component 4 appropriately.

Three or more damper members 10 are generally associated in physical contact with component 4 in order to provide vibration control. As indicated above, such vibration control and contact can be through any appropriate association such that the members 10 may be metal fingers or elastomeric contacts in appropriate engagement with the component 4. Damping control in accordance with the present invention is necessary due to the much reduced resilience provided by only the minimal three clamping pairs provided.

Although only three clamping pairs are utilised in accordance with the present invention, it will be appreciated that these pairs will still hold the component 4 and so inhibit relief of some stress retained within the component 4 as a result of the forging or casting process. In such circumstances, it is preferred in accordance with the present invention to initially turn the component held by the three clamping pairs to an approximation of the desired final profile. Generally, this approximation will be within less than a millimeter of the desired final profile. Once in the approximation to the final profile the clamping pairs through pads 2, 3 will be released to allow the component to relax. This relaxation may result in the component 4 expanding due to stress relief. Clearly, different components 4 will require different periods of time in order to relax for stress relief but nevertheless, after an appropriate period the component 4 will be remounted within the mounting arrangement 1 with the three clamp pairs and the component then finally turned to the final desired profile 6 (FIG. 1).

As the component 4 is mounted by the clamping pairs through pads 2, 3 it will be understood that a rim periphery area 22 of the component 4 cannot be machined due to interference with these pads 2, 3. In such circumstances, normally the component 4 will be released from the present mounting arrangement 1 and mounted in an alternative arrangement to allow appropriate machining of the component 4 in this area 22. This machining may include milling, broaching or other techniques in order to create appropriate rim structures for the component 4. Normally, the rim structure of the component 4 will have a much greater cross-sectional diameter in comparison with the relatively thin area 20 turned into a final profile whilst in the mounting arrangement 1. Thus, such more substantial structural thickness for radial dimension will limit the effects of residual stresses within the component in this area 22 of the component 4.

In view of the above, it will be appreciated that machining of a component 4 in accordance with the present invention will typically be of only two major operation cycles. A first utilising the present mounting arrangement 1 with only three clamping pairs in order to create the thin central wall of the component 4 in the area 20 and a second operation cycle in order to create the rim structures such as blade mounting grooves, etc.

As indicated in FIG. 1 generally the damper 8 is arranged to be substantially perpendicular to the component 4. Such an arrangement is convenient in terms of accommodation within the clamping arrangement 1 and as depicted in FIG. 1 is generally consistent with the major plane of the component 4. In such circumstances, the damper 8 will provide appropriate vibration control without impinging upon the surfaces of the component 4 which must be machined from the initial rough profile 5 to the final profile 6.

The damper 8 as indicated previously will typically comprise a hydraulic ram which extends the damper member 10 towards the surface 11 of the component 4. The force supplied or vibration absorption achieved through the damper member 10 and ram 9 may be variable. Such variability in vibration absorption and therefore control will render the clamping arrangement 1 more effective with regard to actual vibration rather than predicted vibration. In such circumstances, the force supplied through the hydraulic ram 9 in order to create vibration control may be determined through sensing vibration within the component 4 and/or machining device process schedule in terms of current machining step as well as predictive anti-phase vibrations presented through the damper member 10 cancelling vibrations within the component 4 caused by machining operations. Possibly, the damper member 10 will be made from an elastomeric material such as rubber but any device which can engage into vibrational contact will be acceptable.

As indicated previously the number of clamping pairs which form contact abutments in accordance with the present invention will generally be limited to three which is the minimum to present the component 4 for appropriate machining but with sufficient laxity to allow the residual stress relief within the component 4 through the machining cycle. In such circumstances as described the minimum number of contact abutments is generally three in an approximate 120° relationship to each other. However, the specific number of contact abutments may be determined by actual requirements with the damper 8 supplementing in terms of vibration control and under performance by the reduced robustness of such clamping compared to previous arrangements.

A number of dampers are normally provided in engagement with the component 4 in order to achieve appropriate vibration control in association with the abutment contacts in clamping pairs in accordance with the present invention. The positioning of dampers may be determined by the particular shape of the component 4.

The present invention also incorporates a method of machining components from a rough profile 5 to a final profile 6. The method incorporates mounting the component 4 in a clamping arrangement 1 such that there is the minimum number of contact abutments provided as opposed clamping pairs to present the component 4 for appropriate machining. Dampers 8 are then presented to the component 4 in order to augment vibration control achieved by the clamping pairs. In such circumstances, the component 4 subjected to the turning process can relieve residual stresses formed within the component 4 during initial forging or casting processes. The dampers 8 prevent vibration diminishing significantly machining accuracy to the final profile 6. In such circumstances, when the component 4 in the final profile 6 is released from the clamping arrangement 1 the residual stresses within the component have not been retained by the clamping arrangement 1 and so there is less if any distortion of the final profile 6 compared to the desired profile. However, advantageously, the method of the present invention may be used in order to achieve approximation of the final profile 5 using the present method in a first step and mounting arrangement and then the component 4 transiently released from that mounting arrangement and re-secured for a second step of accurate fine turning to the final profile 6. In such circumstances the bulk of residual stresses within the original component 4 and profile 5 are relieved by the present method.

Also in accordance with the present invention there is provision for further machining of the component 4 in order to create rim structures. Thus, the component 4 will be mounted in accordance with the arrangement 1 in order to provide initial turning and machining of the component 4 to the desired profile and then these mountings released and the component 4 mounted in an alternative arrangement in order to provide for machining such as milling, broaching or another technique in order to create the rim structures as required. In such circumstances, the component 4 is appropriately machined by substantially only 2 machining processes as compared to the far greater number of machining stages previously. It will also be appreciated that other structures could be machined into the component 4 in addition to rim structures.

The present invention allows by the arrangement or method accurate machining of a component 4 to a final profile 6. Previously, in order to avoid the problems of distortion due to residual stresses within the component 4 it was not unusual to machine a component 4 in four or more processing steps whereby the component 4 is initially machined and then released to allow the distortion to residual stresses and then the clamp/machine process again repeated until the final profile is achieved. The present invention allows closer approximation to that final profile or even achievement of that final profile with reduced machining steps and intervening release of the component to relieve residual stresses. In such circumstances, the present arrangement and method facilitate greater efficiency of component machining operations from originally forged components.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A mounting arrangement for simultaneous machining of opposite faces of a component which may retain residual stresses, the arrangement comprising multiple point contact abutment clamping of a component, the arrangement consisting of three clamp pairs provided to enable residual stress relief as the component is machined wherein each clamp pair comprises two members relatively movable to engage and hold said component and further incorporating a damper to augment vibration control otherwise diminished by said contact abutment clamping.

2. An arrangement as claimed in claim 1, characterised in that each clamp pair is provided by opposed pairs of a clamping pad and seating pad on opposite faces of the component.

3. An arrangement as claimed in claim 2, characterised in that at least one of the clamping pads or the seating pads is configured for consistency with the surface of the component.

4. An arrangement as claimed in claim 3, characterised in that such consistency ensures appropriate approximate configuration of the component within the mounting arrangement.

5. An arrangement as claimed in claim 1 characterised in that each contact abutment is adjustable in terms of presentation relative to the component.

6. An arrangement as claimed in claim 1 characterised in that the damper is perpendicular to the axial direction of contact abutment.

7. An arrangement as claimed in claim 1 characterised in that the damper comprises a hydraulic ram and a damper member and the damper member is held in contact with the component by a force.

8. An arrangement as claimed in claim 7 characterised in that the force is variable.

9. An arrangement as claimed in claim 7 characterised in that the force applied by the damper is controlled dependent on sensed vibration or machining process step or machining process regime or current process step or to facilitate an anti-phase cancellation oscillation within the component to harmonic vibration beats.

10. An arrangement as claimed in claim 1 characterised in that the damper comprises a contact finger of elastomeric material.

11. A method of simultaneously machining opposite faces of a component which may retain residual stresses, the method comprising clamping the component with multiple point abutment contacts and thereafter machining the component, the method characterised in that the component consists of three clamp pairs with each clamp pair comprising two members relatively movable to engage and hold said component and a vibration damper is applied to the component in order to augment vibration control otherwise diminished by reduced contact abutments.

12. A method as claimed in claim 11, wherein the method comprises an initial machining process for removal of bulk material from a rough initial component wherein the component is then released from said three clamp pairs and then re-secured, to allow residual stresses to be released, with said three clamp pairs and then a final machining process is performed so that by machining with both said initial and final machining processes, a more resilient clamping of the component and more accurate machining of the component is obtained.

* * * * *